United States Patent Office 2,771,468
Patented Nov. 20, 1956

2,771,468

4-ARALKYL-3-MORPHOLONES, 4-ARALKYL-3-HOMOMORPHOLONES AND THEIR PREPARATION

Alexander R. Surrey, Albany, N. Y., assignor to Sterling Drug Inc., New York, N. Y., a corporation of Delaware No Drawing. Application February 19, 1954,
Serial No. 411,551

20 Claims. (Cl. 260—247.7)

This invention relates to 4-aralkyl-3-morpholones, 4-aralkyl-3-homomorpholones, and to their preparation.

The compounds of my invention have the general formula

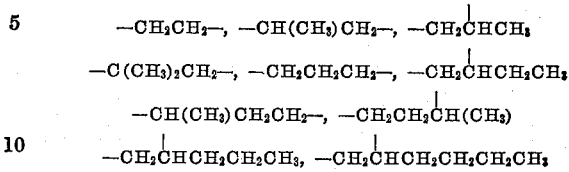

where Ar is a member selected from the group consisting of phenyl, naphthyl, biphenylyl, furyl, pyridyl and thienyl radicals, X is a lower alkylene radical having one to four carbon atoms, Y is a lower alkylene radical having two to six carbon atoms and having its free valences separated by two to three carbon atoms, i. e., alpha,beta-alkylene radicals and alpha,gamma-alkylene radicals, and $R_1$ and $R_2$ are each selected from the group consisting of hydrogen and lower alkyl radicals. These compounds have valuable pharmacological properties, for instance, analgesic and antipyretic activities.

The radical Ar can have from one to three substituents such as halo, lower alkoxy, lower alkyl, lower alkylmercapto, lower alkylsulfonyl, nitro and di (lower alkyl) amino. Furthermore, said substituents can be in any of the available positions of the Ar nucleus, and where more than one substituent, they can be the same or different and can be in any of the various position combinations relative to each other. The halo substituents include chloro, bromo, iodo and fluoro. The lower alkoxy, lower alkyl, lower alkylmercapto and lower alkylsulfonyl substituents, and the lower alkyl radicals of said di (lower alkyl) amino substituent, have preferably one to six carbon atoms, including for instance: methoxy, ethoxy, methylenedioxy, ethylenedioxy, n-propoxy, isopropoxy, isobutoxy, n-amoxy, n-hexoxy, and the like, when lower alkoxy; methyl, ethyl, n-propyl, isopropyl, n-butyl, isobutyl, 2-butyl, n-amyl, n-hexyl, and the like, when lower alkyl; methylmercapto, ethylmercapto, n-propylmercapto, isobutylmercapto, n-hexylmercapto, and the like, when lower alkylmercapto; methylsulfonyl, ethylsulfonyl, n-propylsulfonyl, isobutylsulfonyl, n-hexylsulfonyl, and the like, when lower alkylsulfonyl; and dimethylamino, ethyl-methylamino, diisobutylamino, di-n-hexylamino, and the like, when di (lower alkyl) amino.

Preferred embodiments of my invention are those 4-aralkyl-3-morpholones and -3-homomorpholones where Ar is a phenyl radical as described above.

The lower alkylene radical X has one to four carbon atoms, and includes such examples as

—CH$_2$—, —CH$_2$CH$_2$—, —CH(CH$_3$)—, —C(CH$_3$)$_2$—

—CH$_2$CH$_2$CH$_2$—, —CH$_2$CH(CH$_3$)—, —CH$_2$CH$_2$CH$_2$CH$_2$—

—CH$_2$CH(CH$_2$CH$_3$)—, —CH$_2$CH$_2$CH(CH$_3$)

and the like.

The alpha,beta- or alpha,gamma-alkylene radical Y has two to six carbon atoms, and includes such examples as

—CH$_2$CH$_2$—, —CH(CH$_3$)CH$_2$—, —CH$_2$CHCH$_3$

—C(CH$_3$)$_2$CH$_2$—, —CH$_2$CH$_2$CH$_2$—, —CH$_2$CHCH$_2$CH$_3$

—CH(CH$_3$)CH$_2$CH$_2$—, —CH$_2$CH$_2$CH(CH$_3$)

—CH$_2$CHCH$_2$CH$_2$CH$_3$, —CH$_2$CHCH$_2$CH$_2$CH$_3$ and the like.

The lower alkyl radicals $R_1$ and $R_2$ each has one to six carbon atoms and can be the same or different, including radicals such as methyl, ethyl, n-propyl, isopropyl, n-butyl, isobutyl, 2-butyl, n-amyl, n-hexyl, and the like.

The compounds of my invention were prepared by treating an N-aralkyl-N-(hydroxyalkyl)haloalkanamide having the formula

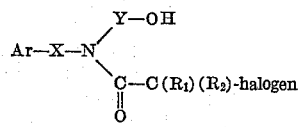

with a strong basic agent, where Ar, X, Y, $R_1$ and $R_2$ have the meanings given above. The halogen radical was preferably chloro, however, other halo radicals, i. e., bromo or iodo also can be used. This reaction was run preferably by stirring at room temperature a solution of an N-aralkyl-N-(hydroxyalkyl)haloalkanamide in a lower alkanol, e. g., ethanol, with an alkali hydroxide, e. g., potassium hydroxide; however, the scope of the reaction is not limited to these preferred conditions. For example, other strong basic agents such as alkali alcoholates, e. g., sodium methoxide, potassium ethoxide, can be used, and also other solvents or mixtures of solvents can be employed, e. g., methanol, propanol, ethanol-acetone. Illustrative of my invention is the preparation of 4-(3,4-dichlorobenzyl)-3-morpholone by treating a solution of N-(3,4-dichlorobenzyl)-N-(2-hydroxyethyl)chloroacetamide in ethanol with potassium hydroxide at room temperature.

The intermediate N-aralkyl-N-(hydroxyalkyl)haloalkanamides having the above formula were prepared by reacting an aralkylaminoalkanol of the formula, Ar—X—NH—Y—OH, with a haloalkanoylating agent selected from the group consisting of those having the formula halogen-C($R_1$)($R_2$)—CO-halogen' and [halogen-C($R_1$)($R_2$)—CO]$_2$O, where $R_1$ and $R_2$ have the meanings given above. When a haloalkanoyl halide was used, the halide halogen, i. e., the halo radical attached to the carbonyl function (halogen'), was preferably chloro, however, other halo radicals, i. e., bromo or iodo also can be used. Illustrations of this preparation are: the preparation of N-(2,4-dibromobenzyl)-N-(3-hydroxybutyl)-2-chloropropanamide by reacting 3-(2,4-dibromobenzylamino)butanol with 2-chloropropanoyl chloride; and the preparation of N-(4-nitrophenethyl)-N-(2-hydroxypropyl)-2-bromobutanamide by reacting 1-(4-nitrophenethylamino)-2-propanol with 2-bromobutanoic anhydride.

When a haloalkanoic anhydride is used, the reaction can be carried out at room temperature or higher if necessary. When a haloalkanoyl halide was used, the reaction was carried out preferably below room temperature, with cooling if necessary. Some of these intermediate N-aralkyl-N-(hydroxyalkyl)haloalkanamides are disclosed in my copending applications Serial No. 411,553, filed February 19, 1954, and Serial No. 502,522, filed April 19, 1955.

The aralkylaminoalkanols of the formula

Ar—X—NH—Y—OH were prepared preferably by one of two procedures: reaction of an aralkyl halide, Ar—X-halogen, with an alkanolamine, H₂N—Y—OH; and, for compounds where X is CH₂, reaction of an aldehyde, Ar—CHO, with an alkanolamine, H₂N—Y—OH, and subsequent catalytic hydrogenation of the resulting anil,

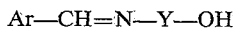
Ar—CH=N—Y—OH

Alternatively, a third method of preparing these aralkylaminoalkanols is the reaction of an aralkylamine, Ar—X—NH₂, with a haloalkanol, halogen-Y—OH. These intermediate aralkylaminoalkanols are also disclosed in my copending applications Serial No. 329,447, filed January 2, 1953, now U. S. Patent 2,732,402, issued January 24, 1956; Serial No. 411,553, filed February 19, 1954; and Serial No. 502,522, filed April 19, 1955.

The following examples will further illustrate specific embodiments of the invention without, however, limiting it thereto.

EXAMPLE 1

A. Aralkylaminoalkanols

As pointed out above these intermediate compounds were prepared preferably by one of two procedures: the reaction of a benzaldehyde with an alkanolamine and catalytic hydrogenation of the resulting anil for the preparation of compounds where X is CH₂; and the reaction of an aralkyl halide with an alkanolamine. Illustrations of these procedures follow.

*2 - (4 - isopropylbenzylamino)ethanol.*—A mixture of 44.3 g. of 4-isopropylbenzaldehyde and 18.3 g. of ethanolamine was heated on a steam bath in vacuo for one hour. The mixture was dissolved in 125 ml. of hot ethanol and reduced catalytically with 0.5 g. of palladium chloride and 3.5 g. of charcoal at about two atmospheres of hydrogen. After the reduction had been completed, the catalyst was filtered off and the alcohol distilled under reduced pressure. The residue which solidified was recrystallized once from n-heptane and once from ether, yielding the product, 2-(4-isopropylbenzylamino)ethanol, M. P. 80.9–83.3° C. (corr.).

*Anal.*—Calcd. for $C_{12}H_{19}NO$: C, 74.55; H, 10.12. Found: C, 74.53; H, 10.16.

2 - (4 - isopropylbenzylamino)ethanol hydrochloride melted at 129.4–132.2° C. (corr.) when recrystallized from ethanol-ether.

*Anal.*—Calcd. for $C_{12}H_{19}NO \cdot HCl$: C, 62.74; H, 8.77; Cl, 15.44. Found: C, 63.00; H, 8.99; Cl, 15.62.

Other benzylaminoethanols prepared by the above illustrated procedure are given in Table I.

TABLE I

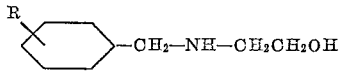

| R | Base, M. P., °C. (corr.) | Hydrochloride, M. P., °C. (corr.) |
|---|---|---|
| 4-OCH₃ | 38–39 | 112.2–113.6 |
| 4-OCH(CH₃)₂ | 75.0–76.6 | 134.9–135.4 |
| 4-OC₂H₅ | 63.0–63.6 | 103–104.6 |
| 4-OC₃H₇-n | 67–68.2 | 134.2–138.2 |
| 4-OC₅H₁₁-n | 51.9–55 | 144–145.5 |
| 3,4-O₂CH₂ | 62.6–64.4 | 152–152.6 |
| 4-OC₄H₉-n |  | 146.6–147.5 |

The following aralkylaminoalkanols were prepared by the reaction of an aralkyl halide with an alkanolamine.

*2 - (2,4 - dichlorobenzylamino)ethanol.*—78.2 g. of 2,4-dichlorobenzyl chloride was added dropwise with stirring to 80 g. of ethanolamine. After standing at room temperature overnight, the mixture was basified with 20% sodium hydroxide solution and extracted with ether. Removal of the ether and recrystallization of the residue with n-heptane gave 56 g. of 2-(2,4-dichlorobenzylamino)-ethanol, melting at 62–62.8° C. (corr.).

*Anal.*—Calcd. for $C_9H_{11}Cl_2NO$: Cl, 32.22. Found: Cl, 32.43.

Alternatively, this product was obtained directly in solid form by pouring the reaction mixture into a large volume of water and stirring.

2 - (2,4 - dichlorobenzylamino)ethanol hydrochloride melted at 184.7–186.7° C. (corr.).

*Anal.*—Calcd. for $C_9H_{11}Cl_2NO \cdot HCl$: C, 42.12; H, 4.70; Cl, 13.80. Found: C, 42.30; H, 4.66; Cl, 13.78.

Other benzylaminoalkanols prepared by the above illustrated procedure for the preparation of 2-(2,4-dichlorobenzylamino)ethanol are given in Table II.

TABLE II

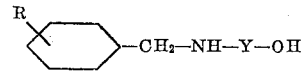

| R | Y | Base, B. P., °C. | Hydrochloride, M. P., °C. (corr.) |
|---|---|---|---|
| 3,4-di-Cl | CH₂CH₂ |  | 145.9–148.1 |
| 2-Cl | CH₂CH₂ |  | 135.2–136.9 |
| 4-Cl | CH₂CH₂ | 126–131 at 0.7 mm. | 172.7–173.8 |
| 2,4-di Cl | CH₂CH₂CH₂ | 150–155 at 0.5 mm. |  |
| 3,4-di-Cl | CH₂CH₂CH₂ | 165–172 at 0.6–0.8 mm. |  |
| 2,4-di-Cl | CH₂CH(CH₃) |  | 152.4–154.2 |

Other aralkylaminoalkanols can be prepared according to the procedures given above using the appropriate benzaldehyde or aralkyl halide and alkanolamine; such compounds include 2 - (2,4 - dibromobenzylamino)-ethanol, 2 - (3,4 - diiodobenzylamino)ethanol, 2 - (4 - fluorophenethylamino)ethanol, 2 - (2,4 - dichlorophenethylamino)ethanol, 2 - [4 - (2,4 - dichlorophenyl)butylamino]ethanol, 2 - (3,4,5 - trichlorobenzylamino)ethanol, 2 - (4 - bromo - 2 - chlorobenzylamino)ethanol, 3 - (2,4 - difluorobenzylamino)butanol, 2 - (4 - n - hexoxybenzylamino)ethanol, 2 - (4 - isobutoxybenzylamino)ethanol, 2 - [2 - (3,4,5 - trimethoxyphenyl)ethylamino]hexanol, 2 - (4 - isobutylbenzylamino)ethanol, 2 - (4 - n - amylbenzylamino)ethanol, 2 - (4 - n - hexylbenzylamino)-ethanol, 3 - (4 - nitrobenzylamino)hexanol, 1 - (4 - nitrobenzylamino) - 2 - propanol, 3 - (4 - nitrobenzylamino)-propanol, 2 - (4 - n - butylmercaptobenzylamino)ethanol, 2 - (4 - n - isobutylsulfonylbenzylamino)ethanol, 1 - (4 - n - butylbenzylamino) - 2 - propanol, 1 - (4 - diethylaminobenzylamino) - 2 - butanol, 3 - (4 - isopropylbenzylamino)propanol, 2 - (1 - naphthylmethylamino)ethanol, 2 - (1 - biphenylylmethylamino)ethanol, 2 - (2 - furylmethylamino)ethanol, 2 - (2 - thienylmethylamino)-ethanol, 2 - (3 - pyridylmethylamino)ethanol, and the like.

An illustration of an alternative method of preparing the intermediate aralkylaminoalkanols is the reaction of 2 - (3,4 - dimethoxyphenyl)ethylamine with ethylene chlorohydrin to form 2 - [2 - (3,4 - dimethoxyphenyl)-ethylamino]ethanol.

B. N-aralkyl-N-(hydroxyalkyl)haloalkanamides

The preparation of these compounds is illustrated by the following preparation of N-(2,4-dichlorobenzyl)-N-(2-hydroxyethyl)chloroacetamide: 22.8 g. of chloroacetyl chloride was added with stirring at about 5° C. to a mixture of 44 g. of 2-(2,4-dichlorobenzylamino)ethanol, 500 ml. of water containing 8 g. of sodium hydroxide and 200 ml. of ethylene dichloride. The addition took about thirty-five minutes. The mixture was allowed to warm up to room temperature with stirring, the layers separated, and the aqueous layer extracted with ethylene dichloride; and this extract was then combined with the original ethylene dichloride layer. Some of the product separated from the ethylene dichloride solution; this was collected on a filter and was recrystallized from ethylene dichloride, yielding about 24.5 g. of N - (2,4 - dichlorobenzyl) - N - (2 - hydroxyethyl)chloroacetamide. An additional 22 g. of product was obtained by evaporation, in vacuo, of the above ethylene dichloride filtrate. An analytical sample of N - (2,4 - dichlorobenzyl) - N - (2 - hydroxyethyl)- chloroacetamide melted at 102.8;105° C. (corr.) when recrystallized from ethylene dichloride.

*Anal.*—Calcd. for $C_{11}H_{12}Cl_3NO_2$: C, 44.54; H, 4.07; $Cl_{KOH}$, 11.96. Found: C, 44.75; H, 4.34 $Cl_{KOH}$, 12.02.

$Cl_{KOH}$ means hydrolyzable chlorine as determined by alkaline hydrolysis followed by gravimetric or amperometric analysis.

When the above procedure is followed but using iodoacetyl chloride or bromoacetyl bromide in place of chloroacetyl chloride, the following respective compounds result: N - (2,4-dichlorobenzyl)-N-(2-hydroxyethyl)iodoacetamide or N-(2,4-dichlorobenzyl)-N-(2-hydroxyethyl) bromoacetamide.

Other N - benzyl - N - (hydroxyalkyl)choroacetamides prepared according to the foregoing procedure are given in Table III.

Table III

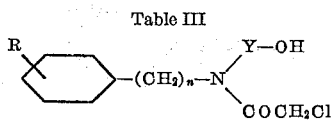

| R | n | Y | M. P., ° C. (corr.) |
|---|---|---|---|
| 4-CH(CH₃)₂ | 1 | CH₂CH₂ | 85.8–87.2 |
| 4-Cl | 1 | CH₂CH₂ | 76.0–77.2 |
| 3,4-O₂CH₂ | 1 | CH₂CH₂ | 92.5–95.2 |
| 4-NO₂ | 1 | CH₂CH₂ | 117.9–120.1 |
| H | 1 | CH₂CH₂ | 85.3–87.9 |
| 4-OC₂H₅ | 1 | CH₂CH₂ | 65.3–66.9 |
| 3,4-di-Cl | 1 | CH₂CH(CH₃) | 83.3–86.9 |
| 3,4-di-Cl | 1 | CH₂CH₂ | (ª) |
| 2-Cl | 1 | CH₂CH₂ | (ª) |
| 4-OC₄H₉-n | 1 | CH₂CH₂ | (ª) |
| 2,4-di-Cl | 1 | CH₂CH(CH₃) | (ª) |
| 3,4-di-OCH₃ | 1 | CH₂CH₂ | (ª) |
| 2,6-di-Cl | 1 | CH₂CH₂ | (ª) |
| 2,4-di-Cl | 1 | CH₂CH₂CH₂ | 84–86 (uncorr.) |
| 2,4-di-Cl | 2 | CH₂CH₂ | (ª) |
| 4-OCH₃ | 1 | CH₂CH₂CH₂ | (ª) |
| 4-Cl | 1 | CH₂CH₂CH₂ | (ª) |
| H | 1 | CH₂CH₂CH₂ | (ª) |
| 3,4-O₂CH₂ | 1 | CH₂CH₂CH₂ | (ª) |
| 3,4-di-Cl | 1 | CH₂CH₂CH₂ | (ª) |
| 2,4-di-Cl | 1 | CH₂C(CH₃)₂ | (ª) |

ª Used directly in next step without further purification.

The foregoing N-aralkyl-N-(hydroxyalkyl)haloalkanamides are also disclosed in my copending application Serial Number 411,553, filed February 19, 1954.

Other N-aralkyl-N-(hydroxyalkyl)haloalkanamides can be prepared according to the above procedure using the appropriate reactants; such compounds include N-(2,4- dibromobenzyl) - N - (2-hydroxyethyl)chloroacetamide, N-(3,4-diiodobenzyl)-N-(2 - hydroxyethyl)-2-chloropropanamide, N - (4-fluorophenylethyl)-N-(2-hydroxyethyl)- 2-bromopropanamide, N - (2,4-dichlorophenylethyl)-N- (2 - hydroxyethyl)-2-chlorobutanamide, N - [4-(2,4-dichlorophenyl)butyl] - N - (2-hydroxyethyl)-2-chlorohexanamide, N - (3,4,5-trichlorobenzyl)-N-(2-hydroxyethyl)- 2-chloro-2-methylpropanamide, N - (4-bromo-2-chlorobenzyl) - N - (2-hydroxyethyl)-2-chloro-2-(n-butyl)propanamide, N - (2,4-difluorobenzyl)-N-(3-hydroxybutyl)- 2-chloro-2-(n - hexyl)octanamide, N - (4-n-hexoxybenzyl) - N - (2-hydroxyethyl)iodoacetamide, N-(4-isobutoxybenzyl) - N - (2-hydroxyethyl)-2-iodopropanamide, N-[2 - (3,4,5-trimethoxyphenyl)ethyl]-N-(2-hydroxyhexyl) - 2 - chloro-2-methylpropanamide,N-(4-isobutylbenzyl)-N-(2 - hydroxyethyl)chloroacetamide, N-(4-n-amylbenzyl)-N-(2 - hydroxyethyl)chloroacetamide, N - (4-n-hexylbenzyl)-N-(2-hydroxyethyl)chloroacetamide, N-(4-nitrobenzyl) - N - (3-hydroxyhexyl)chloroacetamide, N-(4-nitrobenzyl) - N - (2-hydroxypropyl)chloroacetamide, N - (4 - nitrobenzyl)-N-(3 - hydroxypropyl)chloroacetamide, N-(4-n-butylmercaptobenzyl)-N-(2-hydroxyethyl) chloroacetamide, N-(4-n-isobutylsulfonylbenzyl) - N - (2- hydroxyethyl)chloroacetamide, N-(4-n-butylbenzyl) - N- (2-hydroxypropyl)chloroacetamide, N - (4 - diethylaminobenzyl) - N - (2-hydroxybutyl)chloroacetamide, N-(4-isopropylbenzyl) - N - (3 - hydroxypropyl)chloroacetamide, N - (1 - naphthylmethyl)-N-(2 - hydroxyethyl) chloroacetamide, N - (1-biphenylylmethyl) - N - (2-hydroxyethyl)chloroacetamide, N - (2-furylmethyl) - N - (2-hydroxyethyl)chloroacetamide, N - (2-thienylmethyl)- N-(2 - hydroxyethyl)chloroacetamide, N - (3 - pyridylmethyl)-N-(2 - hydroxyethyl)chloroacetamide, and the like.

The foregoing N-aralkyl-N-(hydroxyalkyl)haloalkanamides have utility not only as intermediates in the preparation of my 4-aralkyl-3-morpholones and -3-homomorpholones but also some of them when administered orally to hamsters infected with *Endamoeba criceti* were found to clear the animals at drug levels below 200 mg. per kg. of body weight. For example, N-(2,4-dichlorobenzyl)- N-(2-hydroxyethyl)chloroacetamide had an $ED_{50}$ value of about 30 mg. per kg. of body weight, $ED_{50}$ meaning the effective dose necessary to clear 50% of the hamsters of the amebic infection. Illustrations of other compounds found active are N-(4-chlorobenzyl)-N-(2-hydroxyethyl) chloroacetamide, N - (3,4-dichlorobenzyl)-N-(2-hydroxypropyl)chloroacetamide and N - (3,4 - methylenedioxybenzyl)-N-(2-hydroxyethyl)chloroacetamide.

C. 4-aralkyl-3-morpholones and -3-homomorpholones

The preparation of these compounds is illustrated by the following preparation of 4-(2,4-dichlorobenzyl)-3-morpholone: A solution of 443 g. of N-(2,4-dichlorobenzyl) - N-(2 - hydroxyethyl)chloroacetamide in three liters of absolute ethanol containing 98 g. of potassium hydroxide was stirred for three hours at room temperature. The potassium chloride (137 g.) that separated was filtered off and the alcohol was evaporated in vacuo yielding 335 g. of product, 4 - (2,4-dichlorobenzyl)-3-morpholone, melting at 94–96° C. Recrystallization from benzene-n-pentane or from a large volume of isopropanol gave the product melting at 95.2–95.8° C. (Corr.).

*Anal.*—Calcd. for $C_{11}H_{11}Cl_2NO_2$: C, 50.80; H, 4.27; Cl, 27.26. Found: C, 51.13; H, 4.24; Cl, 27.22.

Other 4-aralkyl-3-morpholones and -3-homomorpholones prepared according to the foregoing procedure are given in Table IV.

TABLE IV

| R | n | Y | M. P., ° C. (corr.) |
|---|---|---|---|
| 4-NO₂ | 1 | CH₂CH₂ | 138.8–139.6. |
| 3,4-di-Cl | 1 | CH₂CH₂ | 69.2–>172(softens). |
| 4-CH(CH₃)₂ | 1 | CH₂CH₂ | B. P., 157° at 0.8 mm. |
| 2-Cl | 1 | CH₂CH₂ | B. P., 140–142° at 0.4 mm. |
| 4-Cl | 1 | CH₂CH₂ | 48.2–49.0. |
| 4-OC₂H₅ | 1 | CH₂CH₂ | 60.5–68.0. |
| 4-OC₄H₉-n | 1 | CH₂CH₂ | 48.8–52.9. |
| 3,4-O₂CH₂ | 1 | CH₂CH₂ | 86.3–90.2. |
| H | 1 | CH₂CH₂ | B. P., 125° at 0.7 mm. |
| 3,4-di-Cl | 1 | CH₂CH(CH₃) | 77.3–85.3. |
| 2,4-di-Cl | 1 | CH₂CH(CH₃) | 68.0–70.9. |
| 3,4-di-OCH₃ | 1 | CH₂CH₂ | B. P., 155° at 0.04 mm. |
| 2,6-di-Cl | 1 | CH₂CH₂ | 109.5–111.6. |
| 2,4-di-Cl | 1 | CH₂CH₂CH₂ | 90.1–91.8. |
| 2,4-di-Cl | 2 | CH₂CH₂ | 83.7–86.8. |
| 4-OCH₃ | 1 | CH₂CH₂CH₂ | 85.8–88.1. |
| 4-Cl | 1 | CH₂CH₂CH₂ | 83.4–85.8. |
| H | 1 | CH₂CH₂CH₂ | 66.9–70.4. |
| 3,4-O₂CH₂ | 1 | CH₂CH₂CH₂ | 80.0–82.2. |
| 3,4-di-Cl | 1 | CH₂CH₂CH₂ | 80.6–82.8. |
| 2,4-di-Cl | 1 | CH₂C(CH₃)₂ | 81.2–83.5. |

Other 4-aralkyl-3-morpholones and -3-homomorpholones can be prepared according to the above procedure using the appropriate reactants; such compounds include 4-(2,4-dibromobenzyl)-3-morpholone, 4-(3,4-diiodobenzyl)-2-methyl-3-morpholone, 4-(4-fluorophenylethyl)-2-methyl-4-morpholone, 4-(2,4-dichlorophenylethyl)-2-ethyl-3-morpholone, 4-[4-(2,4-dichlorophenyl)butyl] 2-n-butyl-3-morpholone, 4-(3,4,5-trichlorobenzyl)-2,2-dimethyl-3-morpholone, 4-(4-bromo-2-chlorobenzyl)-2-n-butyl-2-methyl-3-morpholone, 4-(2,4-difluorobenzyl)-2-n-hexyl-7-methyl-3-homomorpholone, 4-(4-n-hexoxybenzyl)-3-morpholone, 4-(4-isobutoxybenzyl)-2-methyl-3-morpholone, 4-[2-(3,4,5-trimethoxyphenyl)ethyl]-2,2-dimethyl-6-n-butyl-3-morpholone, 4-(4-isobutylbenzyl)-3-morpholone, 4-(4-n-amylbenzyl)-3-morpholone, 4-(4-n-hexylbenzyl)-3-morpholone, 4-(4-nitrobenzyl)-7-n-propyl-3-homomorpholone, 4-(4-nitrobenzyl)-6-methyl-3-morpholone, 4-(4-nitrobenzyl)-3-homomorpholone, 4-(4-n-butylmercaptobenzyl)-3-morpholone, 4-(4-n-isobutylsulfonylbenzyl)-3-morpholone, 4-(4-n-butylbenzyl)-6-methyl-3-morpholone, 4-(4-diethylaminobenzyl)-6-ethyl-3-morpholone, 4-(4-isopropylbenzyl)-3-homomorpholone, 4-(1-naphthylmethyl)-3-morpholone, 4-(1-biphenylylmethyl)-3-morpholone, 4-(2-furylmethyl)-3-morpholone, 4-(2-thienylmethyl)-3-morpholone, 4-(3-pyridylmethyl)-3-morpholone; and the like.

EXAMPLE 2

4-(4-aminobenzyl)-3-morpholone

This compound was prepared by catalytic hydrogenation of 4-(4-nitrobenzyl)-3-morpholone as follows: Nine grams of 4-(4-nitrobenzyl)-3-morpholone was dissolved in 50 ml. of absolute ethanol and the solution placed in the hydrogenator together with 0.25 g. of palladium chloride and 1.5 g. of decolorizing charcoal. A total of 9.0 lbs. of hydrogen was taken up in approximately five hours. The catalyst and charcoal were filtered off and the alcohol evaporated off under reduced pressure. The residual solid material was recrystallized once from benzene and once from isopropanol, yielding the product, 4-(4-aminobenzyl)-3-morpholone, M. P. 112.4–115.0° C. (corr.).

*Anal.*—Calcd. for $C_{11}H_{14}N_2O_4$: C, 64.04; H, 6.84; N, 13.53. Found: C, 63.91; H, 6.90; N, 13.35.

The 4-aralkyl-3-morpholones and -3-homomorpholones of the foregoing examples when administered intraperitoneally were found to reduce elevated temperatures of rats in which fever had been induced by a subcutaneous yeast suspension sixteen hours prior to injection of the compound. Doses of about 25 to 200 mg. per kg. of body weight were found to reduce the temperature of the fevered rats to normal. In addition to having this antipyretic activity my compounds were also found to have analgesic activity when evaluated by the rat thermal radiation test [J. Pharmacol. Exptl. Therap. 84, 301 (1945)].

I claim:

1. A compound having the formula

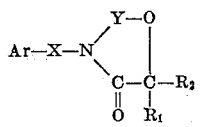

where Ar is a member selected from the group consisting of phenyl, naphthyl, biphenylyl, furyl, pyridyl and thienyl radicals, X is a lower alkylene radical having one to four carbon atoms, Y is a lower alkylene radical having two to six carbon atoms and having its free valences separated by two to three carbon atoms, and $R_1$ and $R_2$ are each selected from the group consisting of hydrogen and lower alkyl radicals.

2. A 4-(halogenated-benzyl)-3-morpholone having the formula

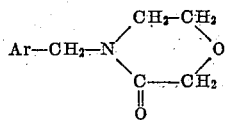

where Ar is a phenyl radical substituted by from one to three halo radicals.

3. A 4-(halogenated-benzyl)-6-methyl-3-morpholone having the formula

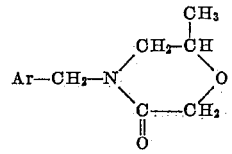

where Ar is a phenyl radical substituted by from one to three halo radicals.

4. A 4-(alkoxylated-benzyl)-3-morpholone having the formula

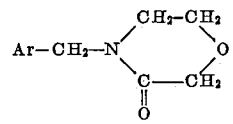

where Ar is a phenyl radical substituted by from one to three lower alkoxy radicals.

5. A 4-(dihalobenzyl)-3-morpholone having the formula

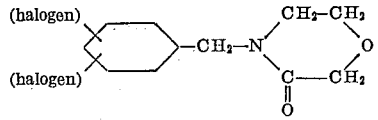

6. A 4-(dihalobenzyl)-6-methyl-3-morpholone having the formula

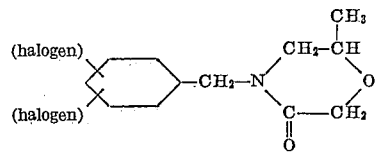

7. A 4-(monohalobenzyl)-3-morpholone having the formula

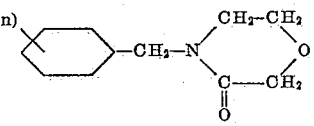

8. A 4-(monoalkoxybenzyl)-3-morpholone having the formula

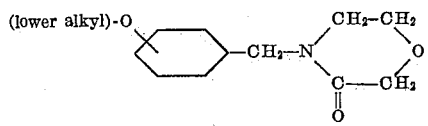

9. A 4-(mononitrobenzyl)-3-morpholone having the formula

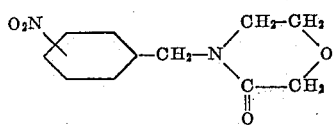

10. 4-(2,4-dichlorobenzyl)-3-morpholone.
11. 4-(2-chlorobenzyl)-3-morpholone.
12. 4-(3,4-dichlorobenzyl)-6-methyl-3-morpholone.
13. 4-(4-ethoxybenzyl)-3-morpholone.
14. 4-(4-nitrobenzyl)-3-morpholone.

15. The process of preparing a compound having the formula

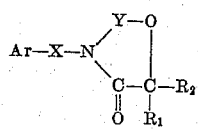

where Ar is a member selected from the group consisting of phenyl, naphthyl, biphenylyl, furyl, pyridyl and thienyl radicals, X is a lower alkylene radical having one to four carbon atoms, Y is a lower alkylene radical having two to six carbon atoms and having its free valences separated by two to three carbon atoms, and $R_1$ and $R_2$ are each selected from the group consisting of hydrogen and lower alkyl radicals, which comprises treating an N-aralkyl-N-(hydroxyalkyl)-haloacetamide having the formula

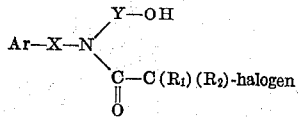

where the halogen radical is selected from the group consisting of chloro, bromo and iodo, with a strong basic agent.

16. The process of preparing a 4-(halogenated-benzyl)-3-morpholone which comprises treating an N-(halogenated-benzyl)-N-(2-hydroxyethyl)chloroacetamide with a strong basic agent.

17. The process of preparing a 4-(alkoxylated-benzyl)-3-morpholone which comprises treating an N-(alkoxylated-benzyl)-N-(2-hydroxyethyl)chloroacetamine with a strong basic agent.

18. A compound having the formula

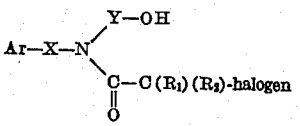

where the halogen radical is selected from the group consisting of chloro, bromo and iodo, Ar is a halogenated-phenyl radical, X is a lower alkylene radical having one to four carbon atoms, Y is a lower alkylene radical having two to six carbon atoms and having its free valences separated by two to three carbon atoms, and $R_1$ and $R_2$ are each selected from the group consisting of hydrogen and lower alkyl radicals.

19. An N-(dihalobenzyl)-N-(2-hydroxyethyl)-chloroacetamide having the formula

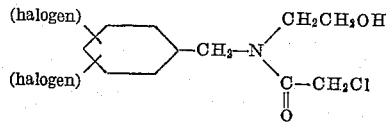

20. N-(2,4-dichlorobenzyl)-N-(2-hydroxyethyl)-chloroacetamide.

References Cited in the file of this patent
UNITED STATES PATENTS

| | | |
|---|---|---|
| 2,139,190 | Iselin et al. | Dec. 6, 1938 |
| 2,400,913 | Burger | May 28, 1946 |
| 2,499,352 | Bruce | Mar. 7, 1950 |

OTHER REFERENCES

Morrison et al.: Jour. Chem. Soc. (London) 1950, pp. 2887–90 (1950).

Vieles et al.: Comptes rendus, vol. 234, pp. 1980–81 (1952).

Kiprianov: Ukrainskii Khemichnii Zhurnal, vol. 4, Science Part, pp. 231–40; abstracted in Chem. Abst., vol. 24, p. 1084 (5) 1929.